(12) United States Patent
Ketteringham

(10) Patent No.: US 6,247,387 B1
(45) Date of Patent: Jun. 19, 2001

(54) FASTENING APPARATUS

(75) Inventor: Roger Harry Ketteringham, Halesowen (GB)

(73) Assignee: McKechnie (UK) Limited, West Midlands (GB)

( * ) Notice: Subject to any disclaimer, the term of this patent is extended or adjusted under 35 U.S.C. 154(b) by 0 days.

(21) Appl. No.: 09/313,405

(22) Filed: May 18, 1999

(30) Foreign Application Priority Data

May 19, 1998 (GB) .................................................. 9810746

(51) Int. Cl.[7] ...................................................... B25B 23/14
(52) U.S. Cl. ................................................. 81/467; 81/469
(58) Field of Search ........................... 81/467, 469, 473, 81/478, 480, 430, 434, 52.37

(56) References Cited

U.S. PATENT DOCUMENTS

| | | | | |
|---|---|---|---|---|
| 3,930,297 | * | 1/1976 | Potucek et al. | 29/431 |
| 4,173,059 | * | 11/1979 | Hashimoto et al. | 29/240 |
| 4,485,698 | | 12/1984 | Adman et al. | 81/57.11 |
| 4,487,270 | * | 12/1984 | Huber | 173/12 |
| 5,083,619 | * | 1/1992 | Giardino et al. | 173/93 |
| 5,155,421 | * | 10/1992 | Hansson | 318/434 |
| 5,203,242 | | 4/1993 | Hansson | 81/469 |
| 5,231,902 | * | 8/1993 | Uno et al. | 81/57.44 |
| 5,490,439 | * | 2/1996 | Matsumura et al. | 81/469 |
| 5,730,035 | * | 3/1998 | Ohmori et al. | 81/57.44 |
| 5,816,121 | | 10/1998 | Yoshimizu et al. | 81/469 |
| 5,862,724 | * | 1/1999 | Arata et al. | 81/434 |
| 5,890,405 | * | 4/1999 | Becker | 81/434 |

FOREIGN PATENT DOCUMENTS

| | | |
|---|---|---|
| 0787931 A1 | 8/1997 | (EP) . |
| 2198983 | 6/1988 | (GB) . |

\* cited by examiner

*Primary Examiner*—James G. Smith
*Assistant Examiner*—David B. Thomas
(74) *Attorney, Agent, or Firm*—Woodcock Washburn Kurtz Mackiewicz & Norris LLP

(57) ABSTRACT

A fastening apparatus 10 for tightening a threaded fastener 14 into a component, the apparatus comprising a drive mechanism 12 for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector.

71 Claims, 9 Drawing Sheets

FASTENING APPARATUS

FIELD OF THE INVENTION

The present invention relates to fastening apparatus used to position and tighten threaded fasteners, and in particular to automated fastening apparatus.

BACKGROUND TO THE INVENTION

Known fastening apparatus apply a predetermined set of conditions to a threaded fastener being tightened. Typically a constant axial load is applied to the threaded fastener which is rotated at a speed determined by the friction generated at the threads of the threaded fastener and the torque applied to the driving bit.

It is an object of the present invention to provide a fastening apparatus that is capable of applying at least two distinct sets of tightening conditions to an associated threaded fastener to improve the speed and efficiency of tightening of the threaded fastener and also to improve its reliability.

SUMMARY OF THE INVENTION

Thus according to the present invention there is provided a fastening apparatus for tightening an associated threaded fastener in which the apparatus applies a first set of tightening conditions to the associated fastener, during a first tightening stage the apparatus being capable of detecting a transitional tightening stage of the associated fastener, and applying a second set of tightening conditions during a second tightening stage in response to the detection of the transitional stage.

According to the present invention there is also provided a fastening apparatus for tightening an associated threaded fastener in which the apparatus rotates the associated threaded fastener at a first speed during a first tightening stage and said apparatus rotates the associated threaded fastener at a second speed during a second tightening stage. The second speed may be faster or slower than the first speed.

According to the present invention there is also provided a fastening apparatus for tightening an associated threaded fastener in which the apparatus applies a first axial load to the associated threaded fastener during a first tightening stage and said apparatus applies a second axial load to the associated threaded fastener during a second tightening stage. The second load may be greater or smaller than the first load.

A further aspect of the invention provides a robotic arm for use on an assembly line, for example for car production, comprising a fastening apparatus according to the earlier aspects of the invention such as a two speed fastening device adapted to enable a threaded fastener to pierce and tap a support layer such as a sheet of aluminium. Beneficially, the robotic arm can be controlled by a programmed device such as a micro controller to move the fastening apparatus to different locations.

BRIEF DESCRIPTION OF THE DRAWINGS

The invention will now be described by way of example only with reference to the accompanying drawings in which.

DESCRIPTION OF THE PREFERRED EMBODIMENT

Figure 1:
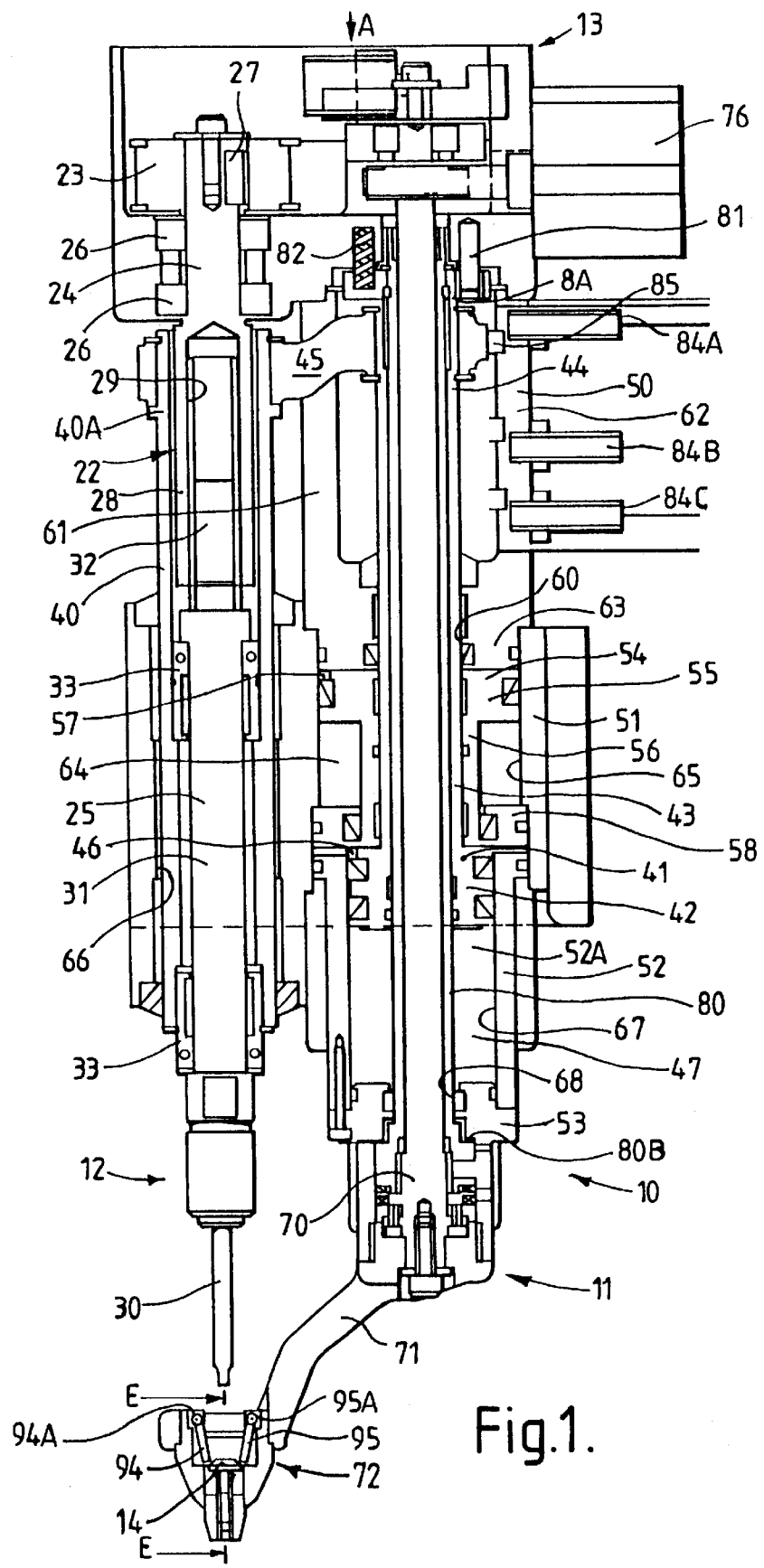
FIG. 1 shows a section view of an apparatus according to the present invention.
Figure 2:
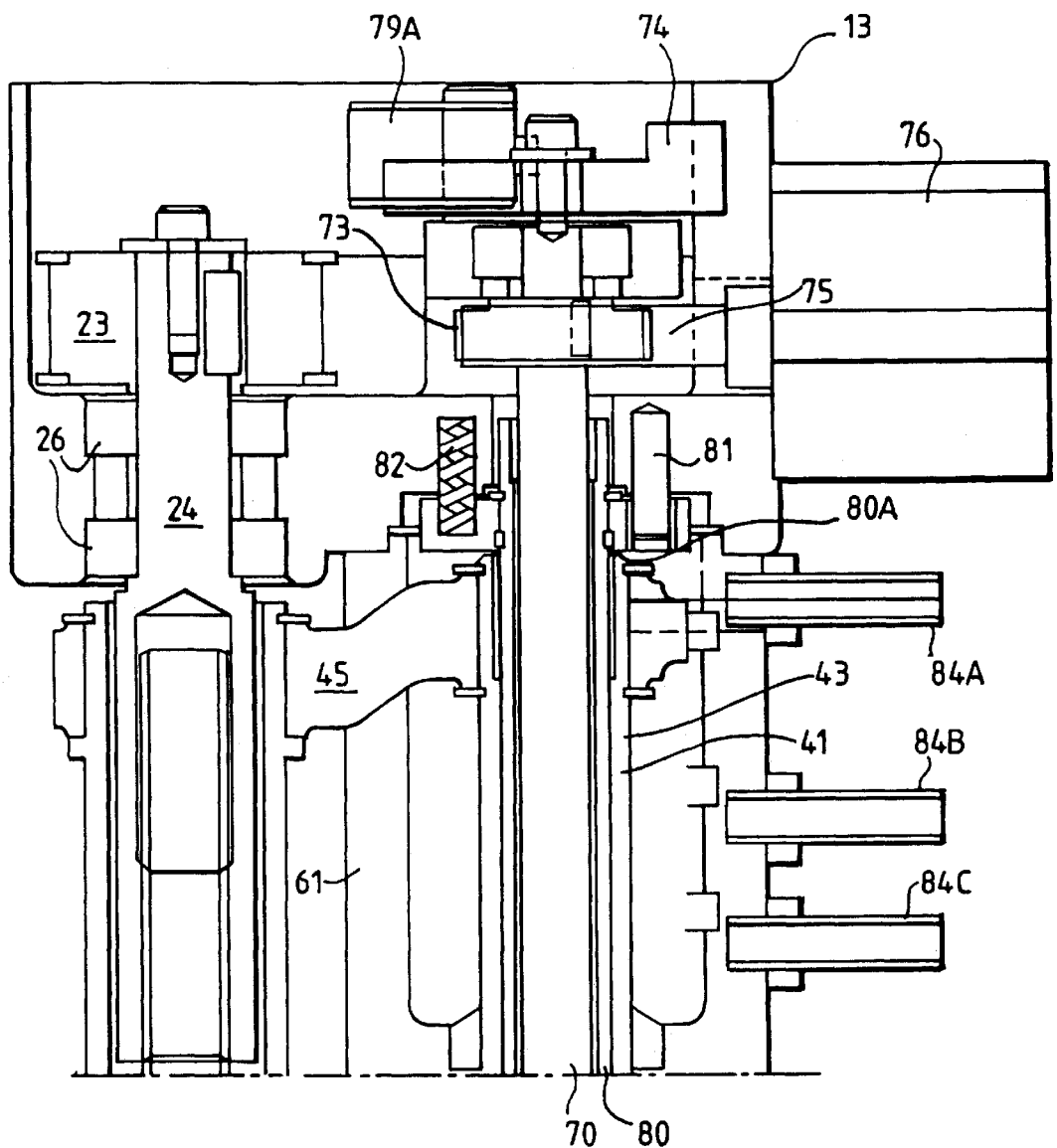
FIG. 2 is an enlarged view of an upper part of FIG. 1.
Figure 3:
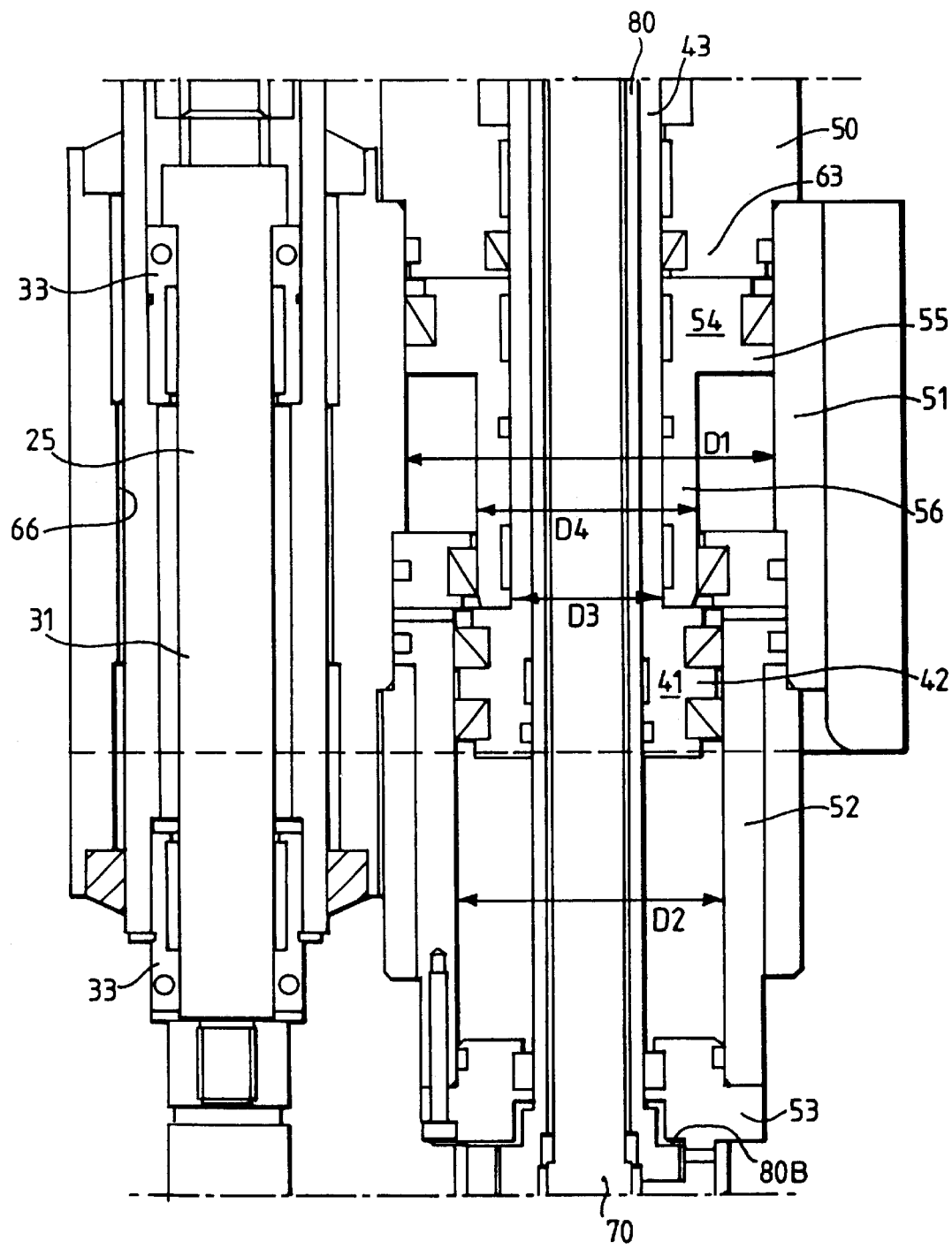
FIG. 3 is an enlarged view of a mid part of FIG. 1.

With reference to FIGS. 1–6 there is illustrated a fastening apparatus 10 comprising a fastening holding/positioning device 11 and a fastening driving device 12. Both are connected to a head 13.

Driving device 12 comprises a motor 20 such as a servo-motor with a motor pulley 20A, a drive belt 21 and a drive shaft 22. Drive shaft 22 comprises a first part 24 and a second part 25. First part 24 is rotatably mounted in head 13 by bearings 26. Bearings 26 also axially secures first part 24 relative to head 13. A drive shaft pulley 23 is rotatably secured on first part 24 by key 27. The lower portion 28 of first part 24 includes an axially splined hole 29.

The second part 25 of drive shaft 22 includes a fastening driving bit 30, a mounting portion 31, and a splined end portion 32. Splined end portion 32 mates with the axially splined hole or bore 29 to ensure relative rotation of the first and second part cannot take place. However, the axially splined hole 29 and the splined end portion 32 do allow axial movement of the first part relative to the second part. The second part is rotatably mounted via bearings 33 in axial positioning tube 40. Bearings 33 also ensure that second part 25 is axially fast with axial positioning tube 40.

The fastening holding/positioning device 11 includes a mounting part 50 secured to head 13, a first cylinder 51 secured to mounting part 50, a second cylinder 52 secured to first cylinder 51 and an end cap 53 secured to second cylinder 52. Mounting part 50 is generally cylindrical in shape with a central axial hole 60 and two lateral slots 61, 62. A portion 63 of mounting part 50 acts as an end cap for the first cylinder 51.

First cylinder 51 comprises a first bore 64, the walls of which constitute a first cylinder wall 65, and a further bore 66 parallel to the first bore 64.

Second cylinder 52 is generally cylindrical in shape and includes a second bore 52A the walls of which constitute a second cylinder wall 67.

End cap 53 has a central axial hole 68, and acts to seal the second cylinder 52.

The fastening holding/positioning device 11 further includes a fastening positioning shaft 70 secured axially and rotatably fast to a fastening positioning arm 71. The end of fastening positioning arm 71 remote from fastening positioning shaft 70 includes a fastening holding device 72. The end of fastening positioning shaft 70 remote from the fastening positioning arm 71 projects into head 13 and is connected rotationally and axially fast to a pinion 73 and a stop arm 74. Pinion 73 engages a rack 75 which in turn is connected to air piston 76. By applying air pressure to either port 77 or 78 the rack 75 can be caused to reciprocate resulting in a clockwise or anti-clockwise rotation of the fastening positioning shaft 70 when viewing FIG. 5. Rotation of fastening positioning shaft 70 is limited by stop arm 74 contacting dampers 79A or 79B (note in FIG. 5 that stop arm 74 is shown in alternative positions at the limit of rotation in both clockwise and anti-clockwise directions). A set of dog clutch teeth 70A is secured to the lower end of the fastening positioning shaft 70.

Fastening positioning shaft 70 is located within locking tube 80. Locking tube 80 is rotationally secured to head 13 by pin 81 but can move relative to head 13 by an amount (B+C) (see FIG. 4). Locking tube 80 includes a set of dog clutch teeth 83 corresponding to and facing dog clutch teeth 70A. Locking tube 80 further includes upper abutment 80A and lower abutment 80B.

Fastening holding device 72 comprises a body 90 with two holding jaws 91,92 each being pivotally mounted, via respective pivots 91A, 92A onto the body 90. Spring 93 (acting in the manner of an elastic band) keeps the holding jaws closed prior to fixing of the fastener but allows the holding jaws to open to allow the fastener to pass through the holding jaws as the fastener is being screwed into the supporting component.

Pawls 94 and 95 can pivot about respective pivots 94A and 95A and are spring loaded into the position shown in FIG. 1. They allow a fastener to be loaded into the fastening holding device 72 and ensure that it does not fall out if the fastening apparatus is being used to secure an overhead component.

Slidably mounted within the first cylinder 51 there is a first piston 54 including a head 55 and a shaft 56. Head 55 is sealed against first cylinder wall 65 and shaft 56 is sealed against shaft 43 (see below).

Axially slidably mounted in second cylinder 52 there is a second piston 41 including a head 42 and a shaft 43. Head 42 is sealed against second cylinder wall 67 and (as mentioned above) shaft 43 is sealed against shaft 56. Second piston shaft 43 extends beyond head 55 of first piston 54. At end 44 of second piston shaft 43 there is axially secured an arm 45 which projects through lateral slot 61. Arm 45 is also axially secured to end 40A of axial positioning tube 40. Thus, second piston 41, arm 45, axial positioning tube 40, bearings 33, second part 25 and fastening drive bit 30 are all axially secured relative to each other.

Mounted in lateral slot 62 are three inductive sensors 84A, 84B and 84C. Mounted on arm 45 there is a conductive lug 85. Conductive lug 85 and inductive sensors 84A, 84B and 84C together act as axial positional sensors indicating the axial position of fastening drive bit 30.

Head 13 can be connected to an apparatus positioning device (not shown) such as a robot arm which positions the fastening apparatus 10 as a whole relative to a corresponding component to be secured by the fastener 14.

Operation of the fastening apparatus 10 is as follows;

With the sets of dog-clutch teeth 70A and 83 disengaged (see below), air piston 76 is actuated such that stop arm 74 abuts damper 79A. In this position the fastening holding device 72 is no longer aligned with the fastening drive bit 30 and it is thus possible to load a fastener 14 into the fastening holding device 72. Air piston 76 is then actuated to rotate the fastening positioning shaft 70 clockwise when viewing FIG. 5 until stop arm 74 contacts damper 79B. Under these circumstances fastening holding device 72 and fastener 14 are aligned with fastening drive bit 30 (see FIG. 1).

Figure 4:
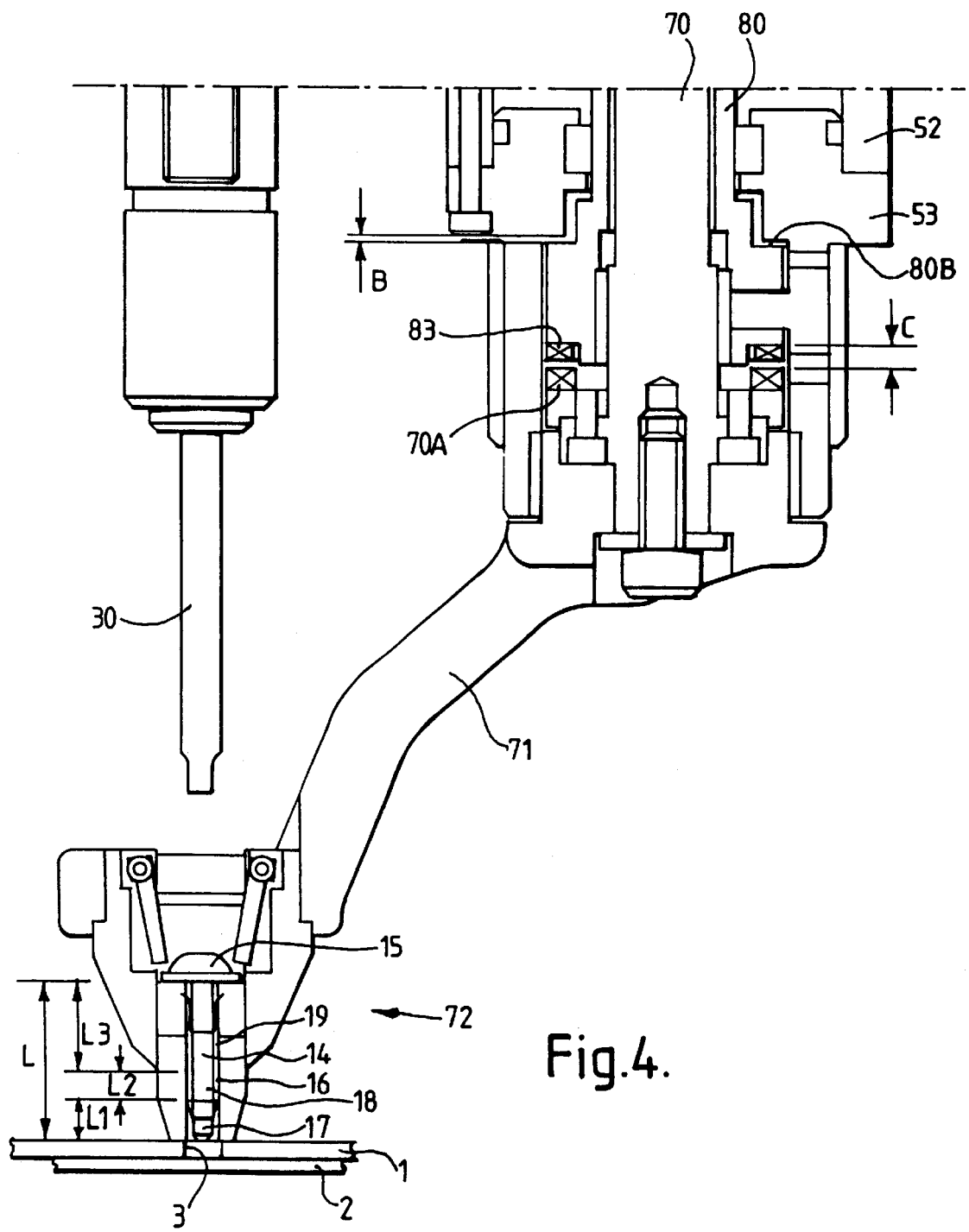
FIG. 4 is an enlarged view of a lower part of FIG. 1.
Figure 5:
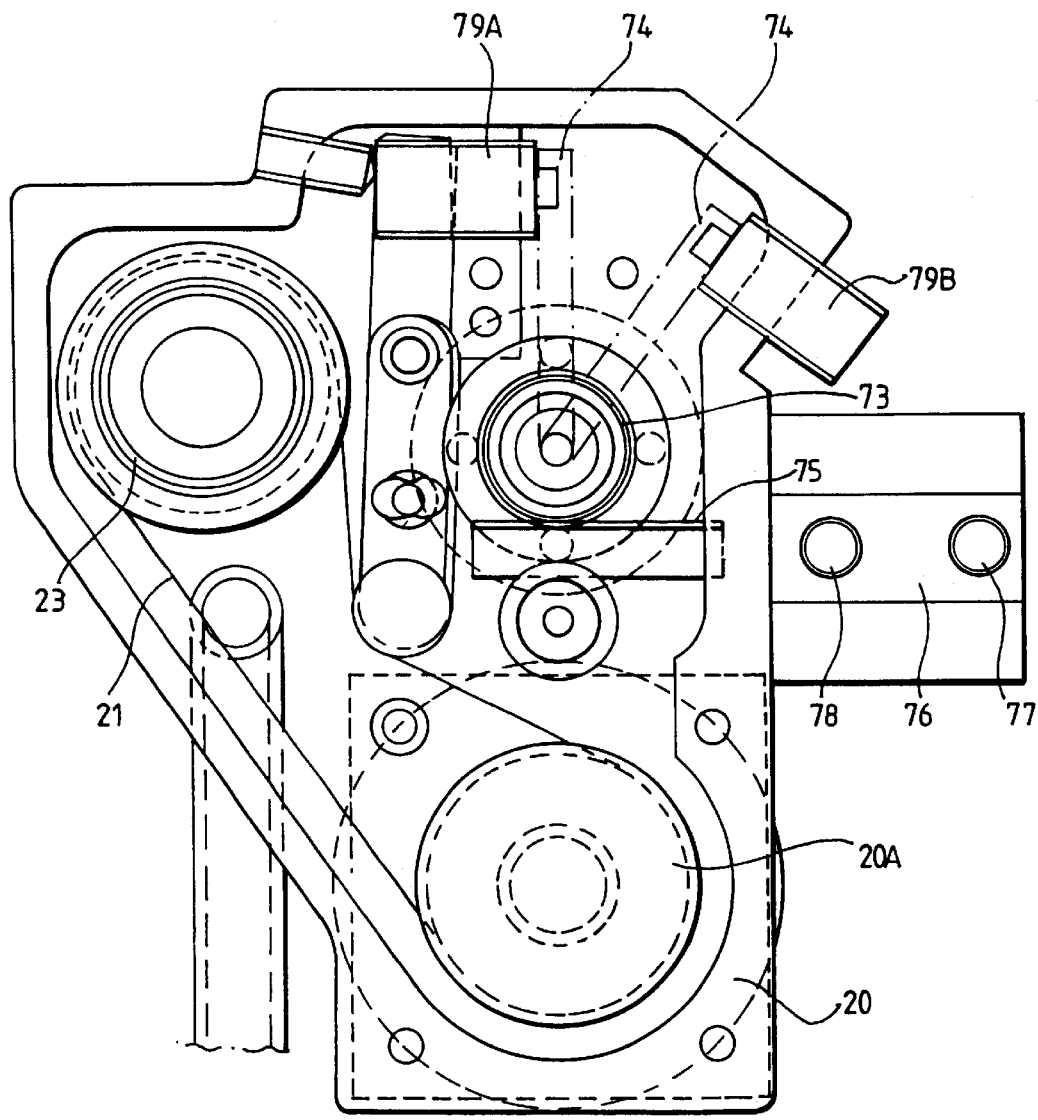
FIG. 5 is a view of the apparatus taken in the direction of arrow A of FIG. 1.
Figure 6:
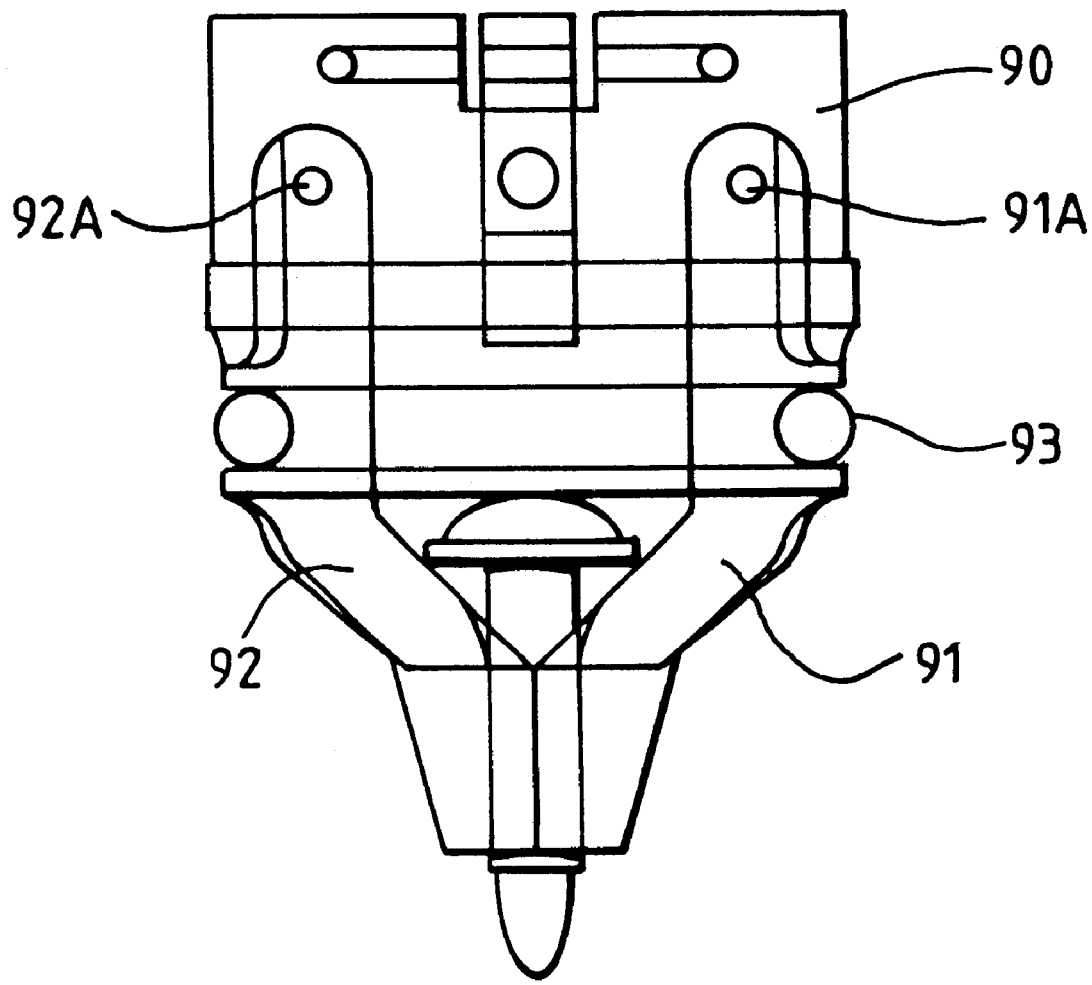
FIG. 6 is a view taken along the line E—E of FIG. 1.

Furthermore the dog-clutch teeth 70A and 83 are aligned such they can engage. Air pressure is evacuated from annular volume 47 allowing the springs 82 (only one shown) to push the locking tube 80 downwards when viewing FIG. 1, and ultimately for the dog clutch teeth 70A and 83 to fully engage and rotationally secure fastening positioning shaft 70 relative to locking tube 80 and hence (via pins 81) relative to fastening driving bit 30. FIG. 4 shows the axial movement of locking tube 80 in progress since abutment 80B has moved off away from end cap 53 by an amount B, but the locking tube 80 still has to move axially by an amount C before the dog-clutch teeth are fully engaged.

Fastener 14 comprises a head 15 and a fixing portion 16 of length L (see FIG. 4). Fixing portion 16 comprises a piercing portion 17 of length L1 a parallel sided non-threaded portion 18 of length L2 and a threaded portion 19 of length L3.

The apparatus positioning device positions the fastening apparatus such that the fastener holding device 72 with fastener 14 is presented proximate the component to be fixed 1 which in turn lies proximate to a component to which it is to be fixed, the supporting component 2 (see FIG. 4). In this case the components to be fixed 1 has a pre-drilled hole 3 through which the fastener 14 will pass and the supporting component 2 is a sheet metal component with no corresponding pre-drilled hole.

The motor 20 is started and runs at a first rotational speed which causes the fastening driving bit 30 to rotate. Air pressure P is admitted simultaneously into the annular volume 57 above the first piston 54 and into the annular volume 46 above the further piston head 42.

The pressure in annular volume 57 causes piston 54 to move downwards when viewing FIG. 1. This causes shaft 56 of piston 54 to act on head 42 of the second piston 41 causing the second piston 41 and all other components axially secured thereto including the fastening driving bit 30 to also move downwards. Fastening drive bit 30 therefore is caused to engage head 15 of fastener 14 which then rotates at the first speed.

The piercing portion 17 of fastener 14 is forced against supporting component 2 by a toad dependent upon the air pressure P admitted into annular volumes 57 and 46 and upon the effective area A1 of the first piston 54 (A1=pi $[D1^2-D3^2]/4$, where D1 is the diameter of the first cylinder 51 and D3 is the diameter of shaft 43) and the initial effective area A2 of the second piston (A2=pi $[D2^2-D4^2]/4$ where D2 is the diameter of the second cylinder and D3 is the diameter of shaft 48).

Figure 7:
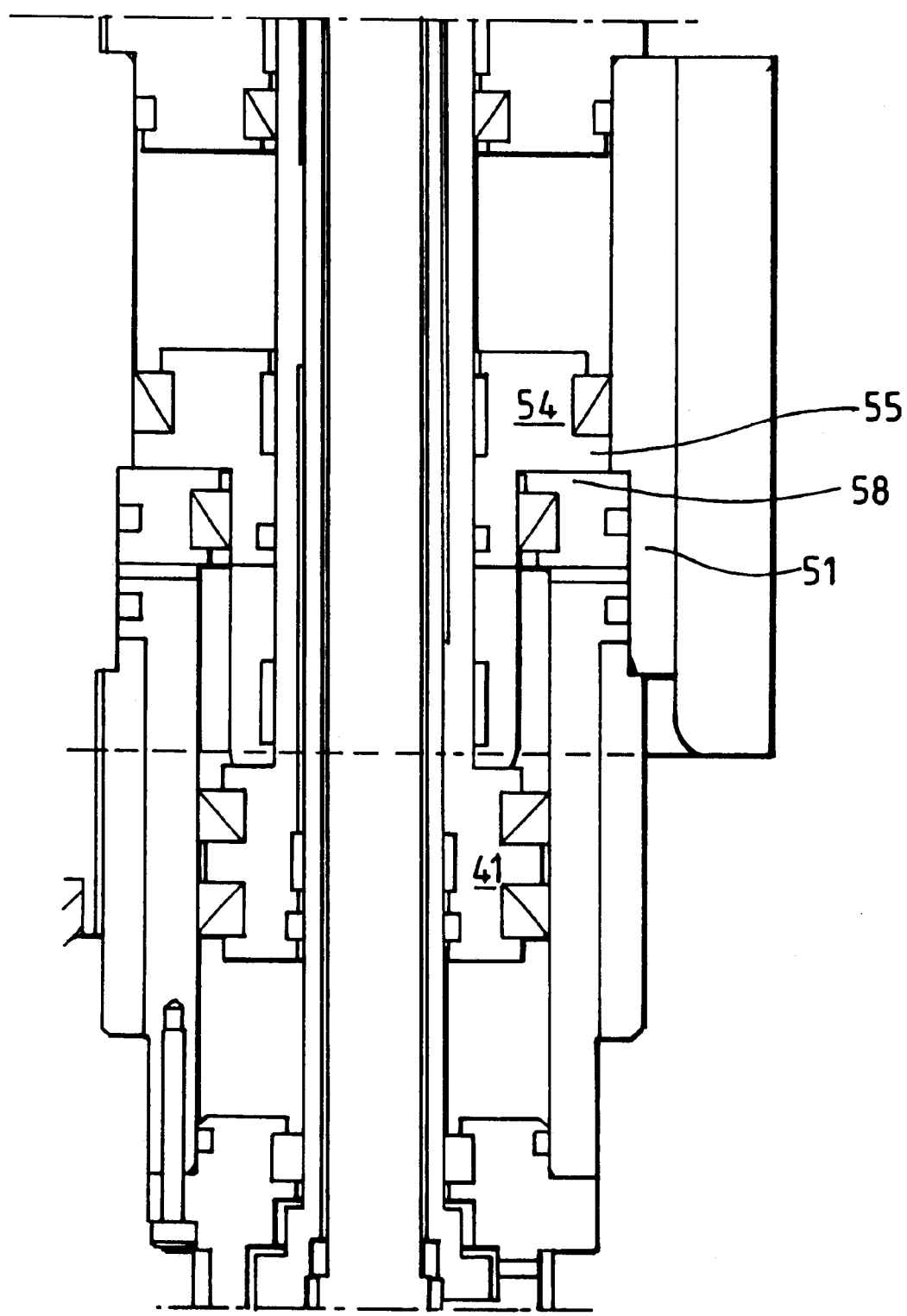
FIG. 7 is a view similar to FIG. 3 with the second piston fully advanced and with the first piston partially advanced.
Figure 8:
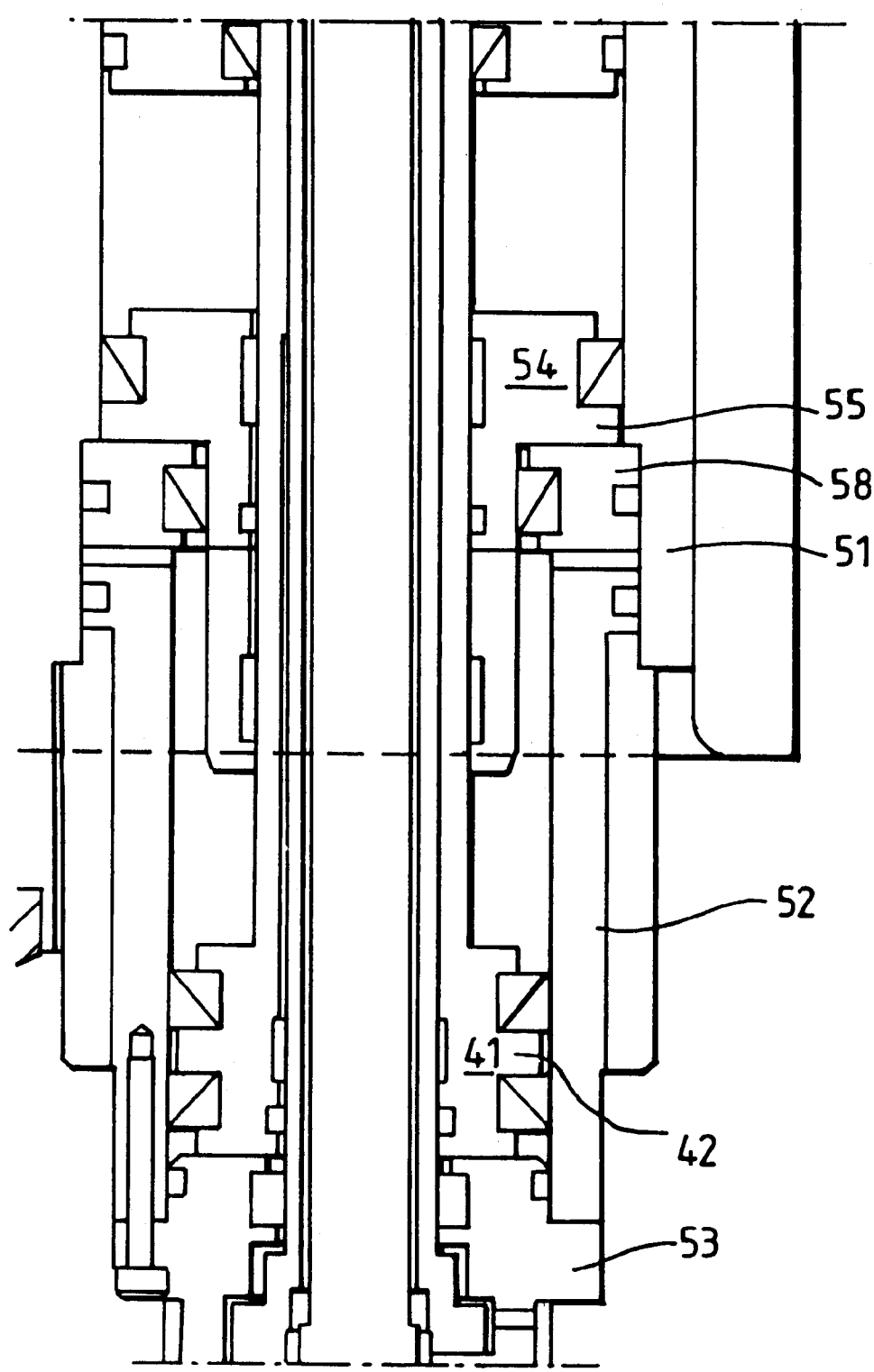
FIG. 8 is a view similar to FIG. 3 with the first and second pistons fully advanced.

The fastener continues to advance and pierces the supporting component 2 whereupon the first piston head 55 contacts abutment 58 axially secured to first cylinder 51 (see FIG. 7). This restricts further movement of first piston 54 but the same air pressure P which has also been admitted into annular volume 46 of further cylinder 52 acts on the new effective area A3 of the second piston (A3=pi $[D2^2-D3^2]/4$). Note that since in this second stage of tightening the shaft 56 no longer contacts the head 42 the effective area of the second piston 41 changes from A2 to A3 (see FIG. 8). Thus the axial load applied to the fastener 14 by the fastening driving bit 30 is initially P (A1+A2) and once piston head 55 has contacted abutment 58 the axial load reduced to P (A3).

Note that in a preferred embodiment separate valves can control the air being fed to annular volumes 46 and 57. In particular such separate valves can admit air at different pressures and at different times, dependent upon the application. Typically the air pressure admitted to annular volume 57 might be 6 bar and the air pressure admitted to annular volume 46 might be 2 bar.

Inductive sensor 84B and conductive lug 85 are arranged such that a signal is produced in the inductive sensor 84B just as the first piston 54 contacts abutment 58. This signal is processed so as to cause a reduction in speed of motor 20 such that the drive shaft 21 now rotates at a second, in this case slower speed, whilst the parallel sided non-threaded portion 18 of fastener 14 passes through the just pierced supporting component 2. A further reduction in speed is effected when the threaded portion 19 of fastener 14 starts to tap a thread in the supporting component 2. By knowing the number of threads on the threaded portion 19 and the speed at which the fastener is being tightened, it is possible to effect a further reduction in speed of tightening as the fastener approaches a fully tightened condition. The motor can be stopped when the tightening torque reaches a predetermined final tightening level so as not to over-tighten the fastener and damage the supporting component 2.

Typical speeds of rotation of the fastener might be 9,000 revs per minute during piercing, reducing to 3,300 revs whilst the parallel sided portion of the fastener is passing through the hole and further reduction to 1,500 revs per minute whilst the threaded portion self-taps supporting component 2 and finally reducing to 500 revs per minute when the fastener is say 5 revolutions (or thread turns) from being fully tightened.

Induction sensor 84C is arranged as a back-up sensor in the event that the final tightening torque is not achieved.

When the final tightening torque is achieved or back-up induction sensor 84C is operated, a signal is generated which is processed to cause annular volumes 46 and 57 to be vented and a pressure to be applied to annular volume 47 which forces the first piston 54 and second piston 41 upwards, resulting in the upper end of second piston 41 contacting the upper abutment 80A of the locking tube 80, which in turn is also caused to move upwards against the action of springs 82. Ultimately this upward movement stops when the lower abutment 80B of locking tube 80 contacts end cap 53. It will be noted that the upward movement of, in particular, locking tube 80 disengages the dog-clutch teeth 70A and 83, thus allowing rotation of the fastening positioning shaft 70 to allow re-loading of a further fastener 14 (see below).

Inductive sensor 84A is positioned so as to recognise when the first piston 54 is fully retracted, whereupon a signal is generated to activate air piston 76 to rotate fastening positioning shaft 70 to a position where another fastener 14 can be loaded into the fastening holding device 72. The apparatus positioning device (not shown) then moves the fastening apparatus 10 to another position so that the new fastener 14 can be used to fix either the same component 1 or a further component, as the case may be.

It can be seen that the apparatus 10 applies a first set of tightening conditions to fastener 14 ie a first rotational speed and an axial load proportional to P (A1+A2). Upon detecting a transitional tightening stage eg after the fastener has moved axially by a predetermined amount or the fastener requires a predetermined torque to turn it, a further set of tightening conditions is then applied to the fastener eg a further rotational speed and an axial load proportional to P (A3).

In further embodiments of the invention, depending upon the type of fastener intended to be used, it is possible to apply two (or more) independent axial loads to the fastener whilst only applying one rotational speed. Also it is possible to use two (or more) speeds of rotation of the fastener whilst only applying a single axial load.

The inductive sensor 84B in conjunction with the conductive lug 85 act as axial positional sensors which can detect transitional tightening stages of the fastener 14. Further embodiments of the invention can use other sorts of positioning sensors such as optical sensors.

Consideration of the fastener 14 shows that there are at least five distinguishable tightening stages:

a) The piercing of supporting component 2 by piercing portion 17.

b) The stage when the parallel sided section 18 passes through the just pierced supporting component 2.

c) The tapping of the just pierced supporting component 2 by the initial threads on the threaded portion 19 of fastener 14.

d) The further threading of the fastener into the just tapped hole of the supporting component 2.

e) The final torquing up of the threaded fastener.

By measuring the torque requirement on the fastening driving bit 30 (by using a torque sensing device e.g. in the case of a driving bit being tightened by a servo-motor, the monitoring of the current required by the servo-motor indicates the driving bit torque) it is possible to distinguish transition points between stages of tightening. For example, the initial tapping of the just pierced hole (sub-paragraph c above) requires a greater torque than the further threading of the fastener into the just tapped hole (sub-paragraph d above).

Furthermore the maximum torque required to tap the hole (sub-paragraph c above) can be greater than the torque required to finally tighten the fastener (sub-paragraph e above). Thus by using different detecting methods to determine at which stage of tightening the fastener is at, accurate tightening can be achieved. In the present case by using axial positioning techniques (sensor 84B) and by knowing the speed of rotation and number of threads, the end of the high torque tapping phase of tightening (sub-paragraph c above) can be detected and then final tightening (sub-paragraph e above) can be carried out by torque measurement.

Fastener 14 initially requires a relatively high rotational speed and axial load to ensure efficient piercing of the support component 2. However, once the hole has been pierced it is advantageous to reduce the rotation speed and axial load so as to ensure better self tapping of the support component 2 and also to ensure that the fastener is not over tightened resulting in stripping of threads of the support component.

It should be noted that relative movement between locking tube 80 and the second piston 41 is only in an axial direction, no rotational movement occurs between these components and this results in an improved service life of the seals between locking tube 80 and the second piston 41.

Figure 9:
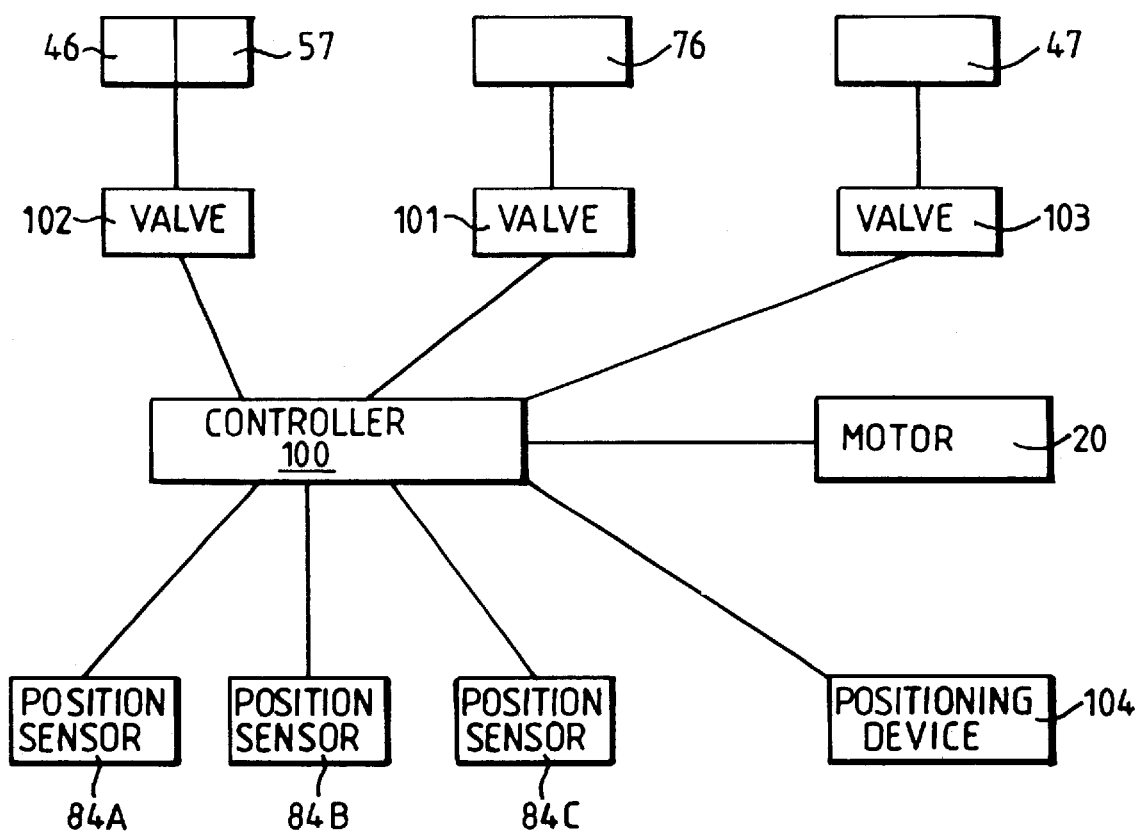
FIG. 9 is a block diagram of a control system used to control the fastening apparatus of the present invention.

FIG. 9 shows a block diagram which summarises a typical control system used in conjunction with the fastening apparatus of the present invention. The controller 100, such on a programmable logic control or plc, can receive inputs from inductive sensors 84A, 84B and 84C, and also a measure of the torque requirement of drive bit 30 via measurement of the servo-motor current. The controller can then output signals to valve 101 to control air piston 76, valve 102 which admits air into and vents air from annular volumes 46 and 57, valve 103 which admits air to and vents air from annular volume 47, positioning device 104 which controls the position of the fastening apparatus and also to servo-motor 20 to vary the speed of rotation of the drive bit 30.

Figure 10:
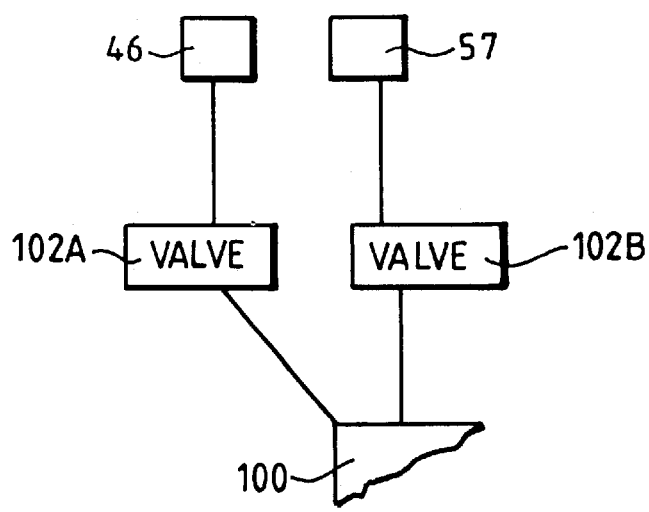
FIG. 10 is a part view of a modified block diagram as shown in FIG. 9 incorporating a preferred embodiment.

FIG. 10 shows the valve 102 of FIG. 9 having been replaced by two separate valves 102A and 102B each admitting and venting air to respective annular volumes 46 and 57. This arrangement allows for different pressures to be admitted to the different annular volumes and also allows the air to be admitted and/or vented at different times.

What I claim is:

1. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector, and further comprising a loading device for varying the axial load on the threaded fastener in use wherein the loading device comprises a pressurised fluid mechanism operably having fluid pressurised to at least a first and second pressure.

2. A fastening apparatus according to claim 1 wherein the drive mechanism applies a first speed of rotation to the fastener during the first tightening stage and a second speed of rotation during the second tightening stage.

3. A fastening apparatus according to claim 2 wherein the first speed of rotation is greater than the second speed of rotation.

4. A fastening apparatus according to claim 1 wherein the loading device applies a first axial load during the first tightening stage and a second axial load during the second tightening stage.

5. A fastening apparatus according to claim 4 wherein the first axial load is greater than the second axial load.

6. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector, and further comprising a loading device for varying the axial load on the threaded fastener in use, wherein the loading device comprises a piston arrangement having a first and a second loadable area, and a pressurised fluid mechanism, thereby enabling variation in the axial load applied by the loading device to the drive mechanism due to change in the application of pressurised fluid by the pressurised fluid mechanism between the first and the second loadable areas.

7. A fastening apparatus according to claim 6 wherein the drive mechanism applies a first speed of rotation to the fastener during the first tightening stage and a second speed of rotation during the second tightening stage.

8. A fastening apparatus according to claim 7 wherein the first speed of rotation is greater than the second speed of rotation.

9. A fastening apparatus according to claim 6 wherein the loading device applies a first axial load during the first tightening stage and a second axial load during the second tightening stage.

10. A fastening apparatus according to claim 9 wherein the first axial load is greater than the second axial load.

11. A fastening apparatus according to claim 6 wherein the detector comprises one or more position sensors for determining the axial position of the threaded fastener during tightening.

12. A fastening apparatus according to claim 6 wherein the detector comprises a sensor for determining the amount of torque applied by the drive mechanism to the threaded fastener in use.

13. A fastening apparatus according to claim 6 comprising a monitoring device for monitoring the variation in torque applied by the drive mechanism to the threaded fastener in use.

14. A fastening apparatus according to claim 6 wherein the detector is adapted to determine when the threaded fastener is close to a tightened position.

15. A fastening apparatus according to claim 13 wherein the detector operably communicates with the torque monitoring device to determine when the threaded fastener is reaching the tightened position thereby to enable the apparatus operably to apply a final set of tightening conditions to the threaded fastener.

16. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector, and further comprising a loading device for varying the axial load on the threaded fastener in use, wherein the loading device comprises a piston arrangement comprising a first piston and a second piston, and wherein the axial load applied by the loading device is variable due to selective use of the first piston and the second piston.

17. A fastening apparatus according to claim 16 wherein the drive mechanism applies a first speed of rotation to the fastener during the first tightening stage and a second speed of rotation during the second tightening stage.

18. A fastening apparatus according to claim 17 wherein the first speed of rotation is greater than the second speed of rotation.

19. A fastening apparatus according to claim 16 wherein the loading device applies a first axial load during the first tightening stage and a second axial load during the second tightening stage.

20. A fastening apparatus according to claim 19 wherein the first axial load is greater than the second axial load.

21. A fastening apparatus according to claim 16 wherein the detector comprises one or more position sensors for determining the axial position of the threaded fastener during tightening.

22. A fastening apparatus according to claim 16 wherein the detector comprises a sensor for determining the amount of torque applied by the drive mechanism to the threaded fastener in use.

23. A fastening apparatus according to claim 16 comprising a monitoring device for monitoring the variation in torque applied by the drive mechanism to the threaded fastener in use.

24. A fastening apparatus according to claim 16 wherein the detector is adapted to determine when the threaded fastener is close to a tightened position.

25. A fastening apparatus according to claim 23 wherein the detector operably communicates with the torque monitoring device to determine when the threaded fastener is reaching the tightened position thereby to enable the apparatus operably to apply a final set of tightening conditions to the threaded fastener.

26. A fastening apparatus according to claim 1 wherein the detector comprises one or more position sensors for determining the axial position of the threaded fastener during tightening.

27. A fastening apparatus according to claim 1 wherein the detector comprises a sensor for determining the amount of torque applied by the drive mechanism to the threaded fastener in use.

28. A fastening apparatus according to claim 1 comprising a monitoring device for monitoring the variation in torque applied by the drive mechanism to the threaded fastener in use.

29. A fastening apparatus according to claim 1 wherein the detector is adapted to determine when the threaded fastener is close to a tightened position.

30. A fastening apparatus according to claim 28 wherein the detector operably communicates with the torque monitoring device to determine when the threaded fastener is reaching the tightened position thereby to enable the apparatus operably to apply a final set of tightening conditions to the threaded fastener.

31. A fastening apparatus according to claim 29 wherein the detector operably communicates with the torque monitoring device to determine when the threaded fastener is reaching the tightened position thereby to enable the apparatus operably to apply a final set of tightening conditions to the threaded fastener.

32. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector, wherein the drive mechanism comprises an axially movable drive shaft journalled in an axially movable sleeve.

33. A fastening apparatus according to claim 32 comprising a guide for guiding the axial movement of the sleeve and drive shaft.

34. A fastening apparatus according to claim 33 wherein the guide comprises an elongate member having a longitudinal axis substantially parallel to the direction of axial movement of the axially movable sleeve.

35. A fastening apparatus according to claim 34 wherein the guide further comprises an arm which radially projects from the axially movable sleeve and co-operates with the elongate member to guide the axial movement of the axially movable sleeve.

36. A fastening apparatus according to claim 32 wherein the drive mechanism applies a first speed of rotation to the fastener during the first tightening stage and a second speed of rotation during the second tightening stage.

37. A fastening apparatus according to claim 36 wherein the first speed of rotation is greater than the second speed of rotation.

38. A fastening apparatus according to claim 32 wherein the loading device applies a first axial load during the first tightening stage and a second axial load during the second tightening stage.

39. A fastening apparatus according to claim 38 wherein the first axial load is greater than the second axial load.

40. A fastening apparatus according to claim 32 wherein the detector comprises one or more position sensors for determining the axial position of the threaded fastener during tightening.

41. A fastening apparatus according to claim 32 wherein the detector comprises a sensor for determining the amount of torque applied by the drive mechanism to the threaded fastener in use.

42. A fastening apparatus according to claim 32 comprising a monitoring device for monitoring the variation in torque applied by the drive mechanism to the threaded fastener in use.

43. A fastening apparatus according to claim 32 wherein the detector is adapted to determine when the threaded fastener is close to a tightened position.

44. A fastening apparatus according to claim 42 wherein the detector operably communicates with the torque monitoring device to determine when the threaded fastener is reaching the tightened position thereby to enable the apparatus operably to apply a final set of tightening conditions to the threaded fastener.

45. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tighten conditions during a second tightening stage in response to the detection of the transitional tightening stage by the detector, and further comprising a locating device for locating the threaded fastener in axial alignment with the drive mechanism.

46. A fastening apparatus according to claim 45 wherein the locating device comprises a holder for the threaded fastener, an arm, and a pivot wherein the arm extends between the pivot and holder to enable rotation of the holder about the pivot.

47. A fastening apparatus according to claim 46 wherein the pivot comprises a pivot axis which pivot axis is substantially parallel to the axis of movement of the drive mechanism in use.

48. A fastening apparatus according to claim 45 wherein the drive mechanism applies a first speed of rotation to the fastener during the first tightening stage and a second speed of rotation during the second tightening stage.

49. A fastening apparatus according to claim 48 wherein the first speed of rotation is greater than the second speed of rotation.

50. A fastening apparatus according to claim 45 wherein the loading device applies a first axial load during the first tightening stage and a second axial load during the second tightening stage.

51. A fastening apparatus according to claim 50 wherein the first axial load is greater than the second axial load.

52. A fastening apparatus according to claim 45 wherein the detector comprises one or more position sensors for determining the axial position of the threaded fastener during tightening.

53. A fastening apparatus according to claim 45 wherein the detector comprises a sensor for determining the amount of torque applied by the drive mechanism to the threaded fastener in use.

54. A fastening apparatus according to claim 45 comprising a monitoring device for monitoring the variation in torque applied by the drive mechanism to the threaded fastener in use.

55. A fastening apparatus according to claim 45 wherein the detector is adapted to determine when the threaded fastener is close to a tightened position.

56. A fastening apparatus according to claim 54 wherein the detector operably communicates with the torque monitoring device to determine when the threaded fastener is reaching the tightened position thereby to enable the apparatus operably to apply a final set of tightening conditions to the threaded fastener.

57. A fastening apparatus for tightening a threaded fastener into a component, the apparatus comprising a drive mechanism for rotating the threaded fastener and a detector for detecting a transitional tightening stage when tightening the threaded fastener to the component, wherein the apparatus operably applies a first set of tightening conditions to the threaded fastener during a first tightening stage, and a second set of tightening conditions during a second tightening stage in response to the detection of the transitional tightening stage by the detector, wherein the drive mechanism comprises a drive shaft which is axially movable along a first axis, and an elongate member having a longitudinal axis substantially parallel with the first axis, and wherein the apparatus further comprises at least one of:

a guide mechanism extending between the drive shaft and elongate member to guide the drive shaft substantially parallel with the elongate member, a loading device which co-operates with both the drive shaft and elongate member to enable variation in the load applied to the drive shaft, and a threaded fastener locating device rotatably mounted on the elongate member.

58. A fastening apparatus according to claim 57 wherein the drive mechanism applies a first speed of rotation to the fastener during the first tightening stage and a second speed of rotation during the second tightening stage.

59. A fastening apparatus according to claim 58 wherein the first speed of rotation is greater than the second speed of rotation.

60. A fastening apparatus according to claim 57 wherein the loading device applies a first axial load during the first tightening stage and a second axial load during the second tightening stage.

61. A fastening apparatus according to claim 57 wherein the first axial load is greater than the second axial load.

62. A fastening apparatus according to claim 57 wherein the detector comprises one or more position sensors for determining the axial position of the threaded fastener during tightening.

63. A fastening apparatus according to claim 57 wherein the detector comprises a sensor for determining the amount of torque applied by the drive mechanism to the threaded fastener in use.

64. A fastening apparatus according to claim 57 comprising a monitoring device for monitoring the variation in torque applied by the drive mechanism to the threaded fastener in use.

65. A fastening apparatus according to claim 57 wherein the detector is adapted to determine when the threaded fastener is close to a tightened position.

66. A fastening apparatus according to claim 64 wherein the detector operably communicates with the torque monitoring device to determine when the threaded fastener is reaching the tightened position thereby to enable the apparatus operably to apply a final set of tightening conditions to the threaded fastener.

67. A fastening apparatus according to claim 14 wherein the detector operably communicates with the torque monitoring device to determine when the threaded fastener is reaching the tightened position thereby to enable the apparatus operably to apply a final set of tightening conditions to the threaded fastener.

68. A fastening apparatus according to claim 24 wherein the detector operably communicates with the torque monitoring device to determine when the threaded fastener is reaching the tightened position thereby to enable the apparatus operably to apply a final set of tightening conditions to the threaded fastener.

69. A fastening apparatus according to claim 42 wherein the detector operably communicates with the torque monitoring device to determine when the threaded fastener is reaching the tightened position thereby to enable the apparatus operably to apply a final set of tightening conditions to the threaded fastener.

70. A fastening apparatus according to claim 55 wherein the detector operably communicates with the torque monitoring device to determine when the threaded fastener is reaching the tightened position thereby to enable the apparatus operably to apply a final set of tightening conditions to the threaded fastener.

71. A fastening apparatus according to claim 65 wherein the detector operably communicates with the torque monitoring device to determine when the threaded fastener is reaching the tightened position thereby to enable the apparatus operably to apply a final set of tightening conditions to the threaded fastener.

* * * * *